(12) United States Patent
Sato

(10) Patent No.: US 6,836,302 B2
(45) Date of Patent: Dec. 28, 2004

(54) ACTIVE MATRIX SUBSTRATE, ELECTRO-OPTICAL DEVICE AND ELECTRONIC EQUIPMENT

(75) Inventor: Takashi Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 18 days.

(21) Appl. No.: 10/614,868

(22) Filed: Jul. 9, 2003

(65) Prior Publication Data

US 2004/0051822 A1 Mar. 18, 2004

(30) Foreign Application Priority Data

Jul. 22, 2002 (JP) .......................................... 2002-212762

(51) Int. Cl.[7] .............................................. G02F 1/13
(52) U.S. Cl. ........................................... 349/46; 349/43
(58) Field of Search ....................... 349/46, 43; 257/59, 257/72

(56) References Cited

U.S. PATENT DOCUMENTS

| | | | |
|---|---|---|---|
| 6,583,830 B2 * | 6/2003 | Yasukawa et al. | 349/43 |
| 6,654,094 B2 * | 11/2003 | Wu | 349/187 |
| 6,714,266 B1 * | 3/2004 | Ueda et al. | 349/38 |
| 2004/0036816 A1 * | 2/2004 | Yun | 349/43 |

* cited by examiner

Primary Examiner—James A. Dudek
(74) Attorney, Agent, or Firm—Oliff & Berridge, PLC (57) ABSTRACT

The invention provides an active matrix substrate used with a liquid crystal device or the like capable of achieving enhanced display quality by adopting field reversal drive. An active matrix substrate according to the present invention is equipped with a plurality of data lines, a plurality of scanning lines, a plurality of TFT elements electrically connected with the data lines and scanning lines, and pixel electrodes electrically connected to the TFT elements. Gate electrodes and the scanning lines constituting the TFT elements are constructed of separate layers and electrically connected through a gate contact hole. The layer constituting the scanning lines is positioned above the layer constituting the data lines but below the layer constituting the pixel electrodes. The pattern of the scanning lines, the pattern of the data lines, and the pattern of the pixel electrodes partly overlap in a top plan view.

18 Claims, 8 Drawing Sheets

ACTIVE MATRIX SUBSTRATE, ELECTRO-OPTICAL DEVICE AND ELECTRONIC EQUIPMENT

BACKGROUND OF THE INVENTION

1. Field of Invention

The present invention relates to an active matrix substrate, an electro-optical device and electronic equipment. More specifically, the invention relates to a construction of an active matrix substrate ideally used with a liquid crystal light valve mounted on a projection display unit.

2. Description of Related Art

A related art liquid crystal light valve is an optical modulating device to be mounted on a projection display unit, such as a liquid crystal projector. The liquid crystal light valve is primarily constructed of a pair of substrates that are disposed to oppose each other with a liquid crystal layer sandwiched therebetween, and electrodes to apply voltages to the liquid crystal layer. Normally, in the related art, the liquid crystal light valve uses an active matrix liquid crystal cell, and it is advantageous to achieve higher definition of images.

As the methods of driving a liquid crystal light valve, reversal drive methods, including dot reversal, line reversal and field reversal, have been used in the related art to reduce or prevent seizure or deterioration of liquid crystal.

Each of the above inversion drive methods has advantages and disadvantages. In the case of the dot reversal or the line reversal, voltages of opposite polarities are applied to the pixel electrodes of adjoining dots, so that a horizontal electric field is generated between the adjoining dots, and light leakage attributable to disclination caused by the horizontal electric field may occur. As mentioned above, since higher definition is required of liquid crystal light valves, the leakage of light leads to deteriorated contrast or aperture ratio, which is a major cause of degraded display quality. From this viewpoint, it is required to adopt a field reversal drive system free of the occurrence of horizontal electric fields.

SUMMARY OF THE INVENTION

However, in the related art, it has been impossible to adopt the field reversal drive method in the construction of a related art active matrix substrate, because of the following reason.

In the field reversal drive, when attention is focused on, for example, a single data line, image signals (voltages) of the same polarity are written in a certain one field with respect to all dots to which a signal from the foregoing data line is supplied. Then, the moment the next field is reached, the polarity of an image signal to be supplied to the foregoing data line is reversed. At this time, on the scanning line side, if scanning is carried out from the top to bottom of a display region, the image signal supplied to the foregoing data line is immediately written at upper dots in the display region. On the other hand, lower dots remain in a prolonged state where pixel electrodes retain an image signal written in the preceding filed, while an image signal of the opposite polarity from that is applied to the data line. During this period of time, coupling between the pixel electrodes and the data line takes place, thus posing a problem in that the potentials of the pixel electrodes vary due to the influences of the data line at the lower dots of the display region, resulting in deteriorated display quality.

The present invention addresses the above and/or other problems, and provides an electro-optical device, such as a liquid crystal device, that permits improved display quality to be achieved by adopting field reversal drive, an active matrix substrate used therewith, and electric equipment.

To this end, an active matrix substrate in accordance with the present invention includes: a substrate body equipped with a plurality of data lines and a plurality of scanning lines provided such that they cross each other, a plurality of thin-film transistors electrically connected to these data lines and scanning lines, and a plurality of pixel electrodes electrically connected to the plurality of thin-film transistors, respectively. Gate electrodes constituting the thin-film transistors and the scanning lines are formed in separate layers, and electrically connected via contact holes penetrating an interlayer insulating film between the gate electrodes and the scanning lines. A layer constituting the scanning lines is positioned above a layer constituting the data lines but under a layer constituting the pixel electrodes, and a pattern of the scanning lines, a pattern of the data lines and a pattern of the pixel electrodes are partly overlapped in a top plan view.

More specifically, in the active matrix substrate in accordance with the present invention, the gate electrodes constituting thin-film transistors (hereinafter "TFTs") are not formed integrally with the scanning lines. Instead, the gate electrodes are independently formed using a different layer from that of the scanning lines, and the gate electrodes and the scanning lines are electrically connected via a contact hole. In the sectional structure, the layer constituting the scanning lines is positioned between the layer constituting the data lines and the layer constituting the pixel electrodes, and the pattern of the scanning lines partly overlaps the pattern of the data lines and the pattern of the pixel electrodes in a top plan view. Structurally, therefore, the portion wherein the scanning lines overlap with the data lines and the pixel electrodes functions as a shielding layer to block the coupling between the pixel electrodes and the data lines described with regard to the related art. This reduces or minimizes the chance of variations occurring in the potentials of pixel electrodes caused by the influences of the data lines at any location in the display region. Thus, an electro-optical device employing the active matrix substrate permits the field reversal drive. The use of the field reversal drive makes it possible to obtain an electro-optical device, such as a liquid crystal device, with, for example, a higher contrast and a higher aperture ratio. Moreover, since the scanning lines required for the active matrix substrate are used as the shielding layer, no separate pattern functioning solely as the shielding layer is added, so that the pattern construction will not be particularly complicated.

In the active matrix substrate in accordance with the present invention, the scanning lines are preferably formed of a material including a metal. Further preferably, the data lines are also formed of a material including a metal. The term "a material including a metal" means that the layer may be formed of a single metal layer or a laminated film containing a metal film.

For instance, a liquid crystal device mounted as an optical modulating device on a projection display unit is irradiated with far more intense light than that applied to a direct view liquid crystal display equipped with, for example, a backlight. At this time, when light is applied to a TFT provided as a pixel switching element, light leakage current passes between source and drain regions, leading to a problem in which the characteristics of the TFT deteriorate or the TFT malfunctions in an extreme case. For this reason, the related art creates a light shielding film on the active matrix substrate. A case may exist where the light shielding film is formed separately from various wires, or scanning lines are formed of a material, e.g., WSi (tungsten silicide) exhibiting high light shielding performance, to use them as the scanning lines serving also as a light shielding film in order to simplify the substrate configuration. However, especially in the latter case, the material, such as WSi, exhibits good light shielding property, while it disadvantageously has a high sheet resistance, approximately 5Ω, leading to a problem of degraded display quality due to signal delay in the scanning lines. In addition, the light shielding film is disposed only in one direction, resulting in inadequate restraint of light leakage current.

In contrast to the above, in the active matrix substrate according to the present invention, if the scanning lines are formed of a material, including a metal, such as aluminum, then the sheet resistance will be sufficiently lower, approximately 0.1Ω, than that of the SWi. Hence, even when the device is driven at a high frequency of 60 Hz or more, the degradation in the display quality attributable to signal delays in the scanning lines can be restrained. Similarly, forming the data lines with a material including a metal, makes it possible to restrain deterioration in the display quality caused by signal delays in the data lines. Especially if both scanning lines and the data lines are formed of a material including a metal, then these scanning lines or the data lines function as a light shielding film and the light shielding film is disposed in a grid pattern, allowing light leakage current to be satisfactorily reduced or restrained.

The gate electrodes may use diverse types of materials. However, it is preferably formed of polycrystalline silicon.

If the scanning lines and the gate electrodes are integrally formed, then using a metal to form the scanning lines automatically means that the gate electrodes are also formed of the metal. If, however, the gate electrodes are formed of a metal, then the metal may diffuse into a gate insulating film during, for example, a heating step in the manufacturing process, and a problem, such as unstable device characteristics of the TFT, may arise. In the active matrix substrate according to the present invention, the scanning lines and the gate electrodes are constructed of separate layers, allowing the materials for these two to be individually selected. Hence, even when the scanning lines are formed of a metal to prevent delays in wiring, the gate electrodes may be formed of polycrystalline silicon. As a result, the device characteristics of the TFT can be stabilized, permitting enhanced reliability to be achieved.

Preferably, a light shielding film extending in a grid pattern in the directions along the scanning lines and the data lines is provided, through the intermediary of an interlayer insulating film, below a semiconductor layer constituting channel regions of the TFTs.

As described above, when the scanning lines or the data lines are formed of a metal with high light shielding performance, these scanning lines and data lines function as a light shielding film, making it possible to block light entering from above the substrate into the TFTs. In addition, when a light shielding film extending in a grid pattern in the directions along the scanning lines and the data lines is provided under the semiconductor layer constituting the channel region of the TFT, it is possible to block the entry of light from below the substrate into the TFT.

Furthermore, a storage capacitor electrode to form a storage capacitor between itself and the semiconductor layer constituting the channel region of the TFT is provided, and the storage capacitor electrode is formed of the same layer as the layer constituting the gate electrode.

With this arrangement, an image signal (voltage) written to a pixel electrode will be retained further securely, and the storage capacitor electrode constituting the storage capacitor can be formed at the same time when the gate electrode is formed, thus reducing or preventing the manufacturing process from becoming complicated.

Furthermore, when the storage capacitor electrode and the light shielding film (the light shielding film under the semiconductor layer) are provided, the storage capacitor electrode and the light shielding film are preferably electrically connected through a contact hole penetrating an interlayer insulating film between these storage capacitor electrode and the light shielding film.

With this arrangement, the storage capacitor electrode and the light shielding film share the same potential, and they are positioned above and under the semiconductor layer of the TFT, respectively, through the intermediary of the interlayer insulating film, allowing the double-stage storage capacitor to be formed above and under the semiconductor layer. As a result, the storage capacitor value in a certain occupied area can be increased, and the display quality can be enhanced.

Alternatively, the area occupied by the storage capacitor can be decreased to obtain a predetermined storage capacitor value, and the aperture ratio can be increased. Moreover, since the potential of the light shielding film positioned below the TFT can be fixed, the operational stability of the TFT can be enhanced.

The scanning lines may be configured to have portions that protrude along the data lines from the trunks of the scanning lines. Similarly, the data lines may be configured to have portions that protrude along the scanning lines from the trunks of the data lines.

With this arrangement, a portion that is branched from the trunk of a scanning line or a trunk of a data line and protrudes in a perpendicular direction can constitute a part of the light shielding film, making it possible to further improve the light shielding performance with respect to the TFT.

Alternatively, a relaying conductive film formed of the same layer as the layer constituting the data lines may be provided, and the semiconductor layer and the pixel electrodes may be electrically connected through the relaying conductive film. For example, if the pixel electrodes are formed of a transparent conductive film of, for example, indium tin oxide (hereinafter "ITO") or the like, then preferably, at least the upper surface of the relaying conductive film is formed of a material permitting ohmic connection with the transparent conductive film.

With this arrangement in which the relaying conductive film is provided, even when the distance between the semiconductor layer and the pixel electrode layer is long, e.g., about 1 μm to about 2 μm, these two layers can be successfully connected via two or more contact holes having a relatively small diameter, while reducing or avoiding the technological difficulty of connecting the two layers via a single contact hole. Thus, the aperture ratio of pixels can be increased. Although the semiconductor layer constituting the TFT is usually extremely thin, it is useful to reduce or prevent over-etching when opening contact holes. Especially when at least the upper surface of the relaying conductive film is formed of a material that permits ohmic connection with the transparent conductive film, the contact resistance can be decreased.

Furthermore, a drive circuit to drive the scanning lines or the data lines may be provided, and a gate line for the TFT constituting the drive circuit may be formed by using the layer constituting the scanning lines, the layer constituting the data lines, or the layer constituting the gate electrodes.

The TFTs corresponding to the dots in the display region must be formed such that the scanning lines and the gate electrodes are constituted in separate layers and electrically connected through the contact holes in order to obtain the aforesaid advantages according to the present invention. Meanwhile, when the drive circuit is provided on the active matrix substrate, there are no particular restrictions on the TFTs making up the drive circuit. Hence, the gate lines may be formed by selecting one of the layer constituting the scanning lines, the layer constituting the data lines, or the layer constituting the gate electrodes.

Preferably, the upper surface of a region where the scanning lines or the data lines are formed is positioned at a higher level than the upper surface of a central portion of a region where the pixel electrodes are formed.

As described above, disclination may occur and light leakage may happen in the boundary of adjoining dots. To reduce or prevent this problem, the aforesaid arrangement is advantageous in that the region wherein the scanning lines or the data lines are formed, that is, the peripheral portions of the dots, is shaped like an embankment, and the liquid crystal layer of the peripheral portions of the dots is thinner than that of the central portion of the region where the pixel electrodes are formed, that is, the liquid crystal layer of the central portions of the dots. Thus, in the peripheral portions of the dots, the intensity of the vertical electric field applied to the liquid crystal layer is higher, providing an advantage of reduced disclination.

When the above arrangement is adopted, the upper surface of the interlayer insulating film in contact, at the bottom side of the data lines, with the data lines may be planarized. Alternatively, the upper surface of the interlayer insulating film in contact, at the bottom side of the scanning lines, with the scanning lines may be planarized.

As described above, when the peripheral portions of the dots are shaped like embankments, the planarized upper surface of the interlayer insulating film in contact with the data lines at the bottom side of the data lines makes it possible to adjust the height of the embankment by use of the film thickness of the data lines or the scanning lines. This allows the disclination to be securely controlled. Furthermore, the planarized upper surface of the interlayer insulating film in contact with the scanning lines at the bottom side of the scanning lines makes it possible to adjust the height of the embankment only by use of the film thickness of the scanning lines.

Alternatively, a recessed portion is provided in the region of the substrate body wherein the TFTs are formed.

With this arrangement, some of the TFTs may be embedded in the recessed portion of the substrate body, and contrary to the above case, the upper surface of the active matrix substrate can be further planarized.

An electro-optical device in accordance with the present invention includes the aforesaid active matrix substrate in accordance with the present invention.

With this arrangement, the provision of the active matrix substrate in accordance with the present invention permits the use of the field reversal drive, making it possible to obtain an electro-optical device, such as a liquid crystal device, with a high contrast and a high aperture ratio.

An electronic equipment in accordance with the present invention includes the aforesaid electro-optical device in accordance with the present invention.

This arrangement makes it possible to accomplish electronic equipment provided with a display unit featuring high display quality.

DETAILED DESCRIPTION OF PREFERRED EMBODIMENTS

[First Exemplary Embodiment]

A first exemplary embodiment in accordance with the present invention is explained below with reference to FIG. 1 through FIG. 4.

In this exemplary embodiment, as an example of an electro-optical device using the active matrix substrate according to the present invention, a liquid crystal device (liquid crystal light valve) to be mounted on a projection display unit is described below.

Figure 1:
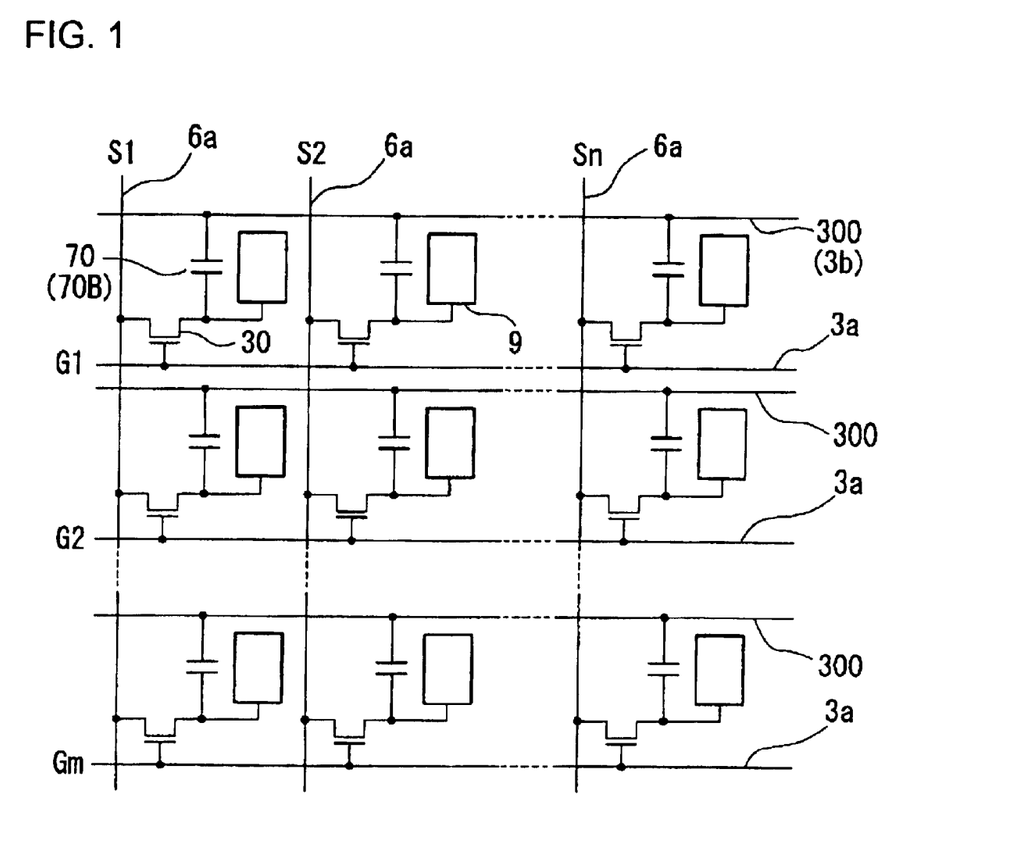
FIG. 1 is a schematic of an equivalent circuit of various elements, wires, etc., in a plurality of pixels formed in a matrix pattern that constitutes an image display region of a liquid crystal device according to a first exemplary embodiment of the present invention.
Figure 2:
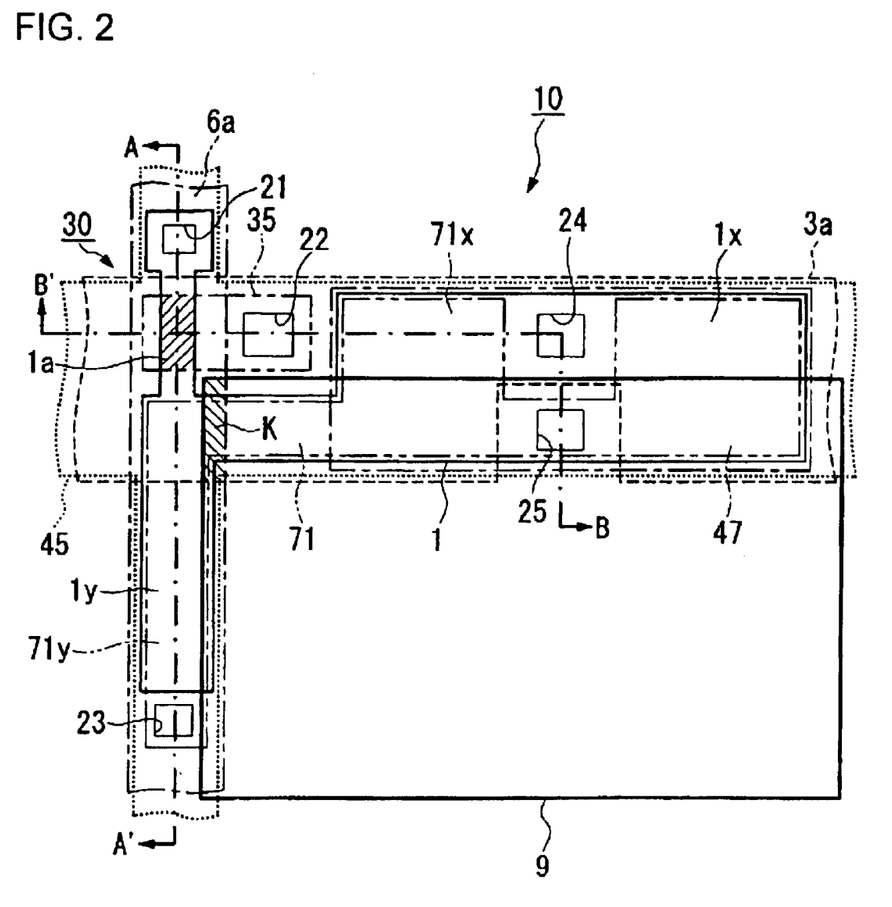
FIG. 2 is a top plan view showing a pattern configuration of one dot of a TFT array substrate (active matrix substrate) used with the liquid crystal device.
Figure 3:
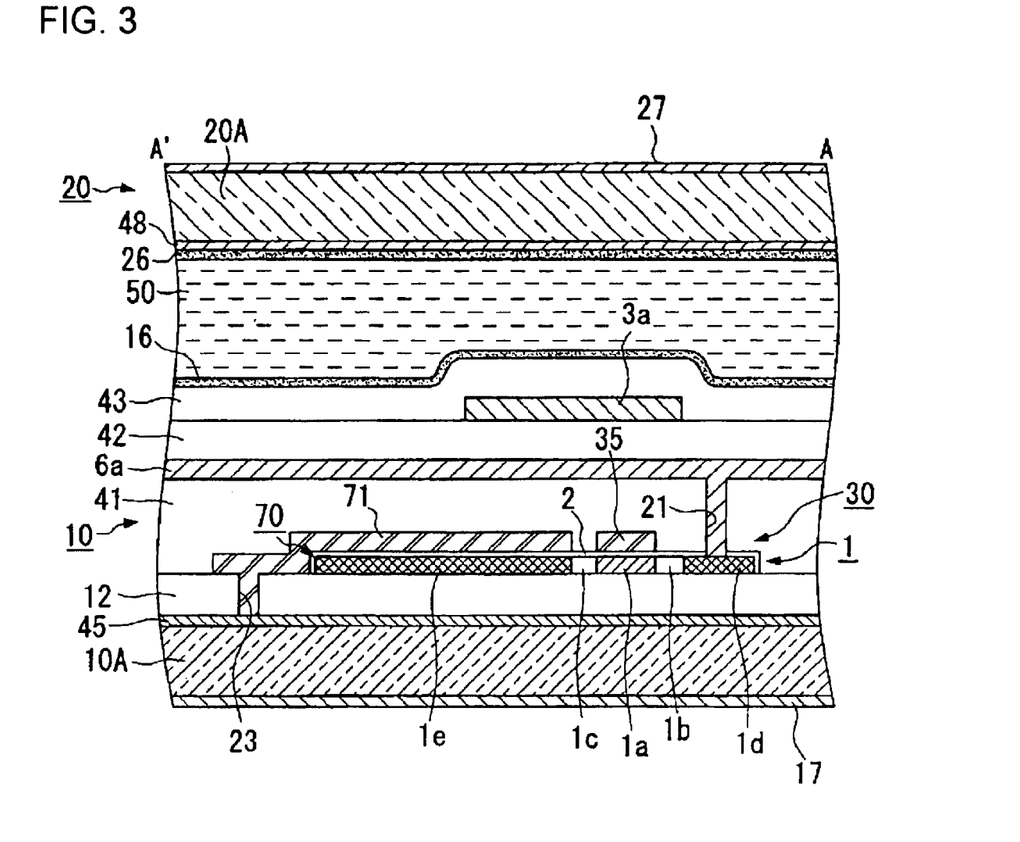
FIG. 3 is a sectional view taken along plane A–A' of FIG. 2.
Figure 4:
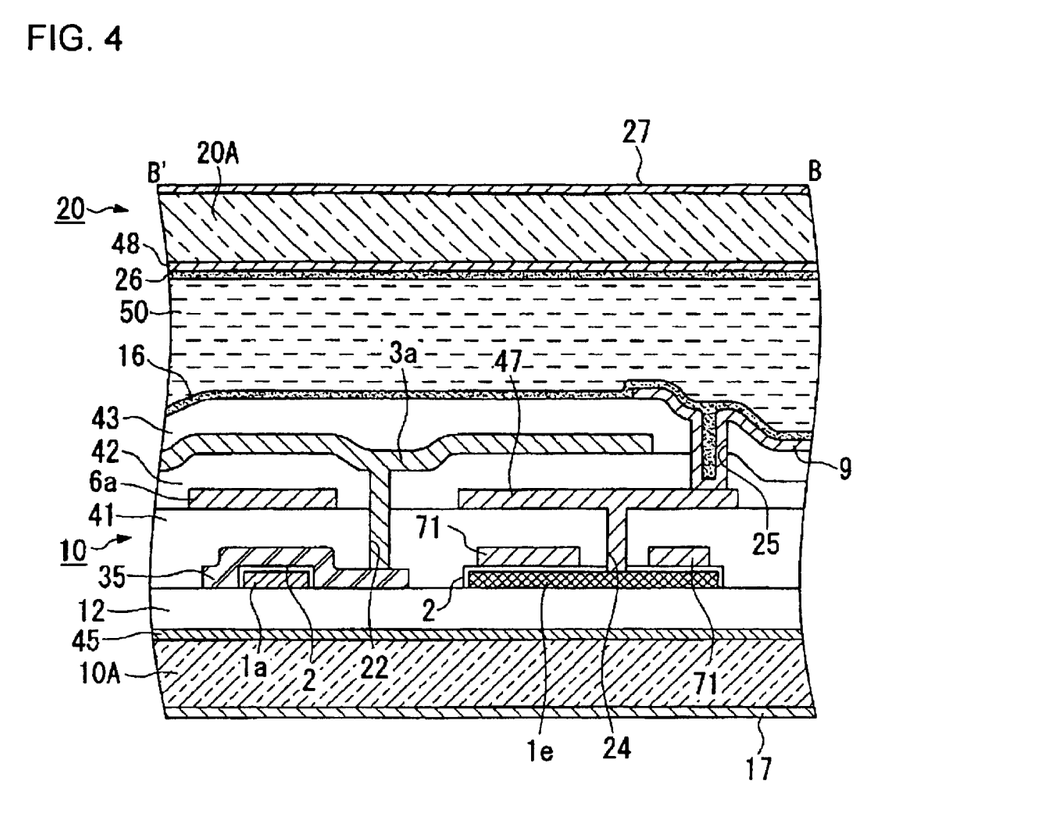
FIG. 4 is a sectional view taken along plane B–B' of FIG. 2.

FIG. 1 is a schematic of an equivalent circuit showing various elements, wires, etc., in a plurality of pixels arranged in a matrix pattern to make up an image display region of a liquid crystal device. FIG. 2 is a top plan view showing a pattern configuration of one dot on a TFT array substrate (active matrix substrate) on which data lines, scanning lines, pixel electrodes, etc. are formed. FIG. 3 is a sectional view taken along plane A–A' of FIG. 2, and FIG. 4 is a sectional view taken along plane B–B' of FIG. 2. In the drawings, different scales of the layers and members are used to make their sizes recognizable in the drawings.

In FIG. 1, each of the plural dots formed in the matrix pattern to make up the image display region of the liquid crystal device in this exemplary embodiment has a pixel electrode 9 and a TFT element 30 to control the turning ON/OFF of the pixel electrode 9. Data lines 6a to which image signals are supplied are electrically connected to source regions of the TFT elements 30. Image signals S1, S2, ..., Sn to be written to the data lines 6*a* may be supplied in this order in the sequence of the lines, or supplied on a group basis to plural adjoining data lines 6*a*.

Scanning lines 3*a* are electrically connected to gates of the TFT elements 30. Scanning signals G1, G2, ..., Gm are applied in pulses to the scanning lines 3*a* at predetermined timings in this order in the sequence of the lines. The pixel electrodes 9 are electrically connected to drains of the TFT elements 30, and the TFT elements 30 functioning as switching elements are turned ON for a predetermined period of time thereby to write the image signals S1, S2, ..., Sn supplied from the data lines 6*a* at predetermined timings. The image signals S1, S2, ..., Sn of predetermined levels that have been written to a liquid crystal through the intermediary of the pixel electrodes 9 are retained for a predetermined period between the pixel electrodes and common electrodes (discussed below) formed on an opposing substrate (discussed below).

In order to reduce or prevent the retained image signals from leaking, storage capacitors 70 are added in parallel to liquid crystal capacitors formed between the pixel electrodes 9 and the common electrodes.

As shown in FIG. 2, rectangular pixel electrodes 9 are provided on a TFT array substrate 10, and data lines 6*a* and scanning lines 3*a* are provided such that they run along the vertical and horizontal boundaries of the pixel electrodes 9. The TFT elements 30 are provided to correspond to the portions where the data lines 6*a* and the scanning lines 3*a* cross each other. A semiconductor layer 1 on which channel regions, etc. of the TFT elements 30 are formed has a portion 1*y* extending along the data line 6*a* toward the scanning line 3*a* in the next stage (the lower side in FIG. 2) and a portion 1*x* extending along the scanning line 3*a* toward the data line 6*a* in the next stage (the right side in FIG. 2). A source contact hole 21 to electrically connect a high-concentration source region of the semiconductor layer 1 and the data line 6*a* is provided at an end opposite from the portion 1*y* extending toward the scanning line 3*a* of the next stage of the semiconductor layer 1. A lower light shielding film 45 is provided in a grid pattern in the directions in which the data lines 6*a* and the scanning lines 3*a* extend, the width thereof being substantially the same as those of the data lines 6*a* and the scanning lines 3*a*.

A gate electrode 35 is provided such that it crosses the portion located between the portion 1*y* extending toward the scanning line 3*a* of the next stage of the semiconductor layer 1 and a portion having the source contact hole 21. The gate electrode 35 is made as a separate layer from the scanning line 3*a* and in the form of an isolated island, and has a gate contact hole 22 at one end thereof to electrically connect the gate electrode 35 and the scanning line 3*a*. Hence, in the semiconductor layer 1, the portion indicated with slashes having their right ends down in FIG. 2 that crosses the gate electrode 35 on a plane provides a channel region 1*a*.

A storage capacitor electrode 71 is provided by sharing the same layer of the gate electrode 35. The storage capacitor electrode 71 has a portion 71*y* extending along the data lines 6*a* toward the scanning line 3*a* in the next stage (the lower side in FIG. 2) to overlap the semiconductor layer 1, and a portion 71*x* extending along the scanning lines 3*a* toward the data line 6*a* in the next stage (the right side in FIG. 2). The distal end of the portion 71*y* of the storage capacitor electrode 71 that extends toward the scanning line 3*a* of the next stage protrudes beyond the distal end of the portion 1*y*. In the protruding portion, a capacitor contact hole 23 is provided to electrically connect the storage capacitor electrode 71 and the lower light shielding film 45.

A relaying conductive film 47 is provided by sharing the same layer with the data lines. The relaying conductive film 47 is provided in a rectangular shape such that it overlaps at least the high-concentration drain region of the semiconductor layer 1 and the pixel electrode 9 on a plane, and it serves to electrically connect the high-concentration drain region of the semiconductor layer 1 and the pixel electrode 9. Provided on the relaying conductive film 47, therefore, are a drain contact hole 24 to electrically connect the high-concentration drain region of the semiconductor layer 1 and the relaying conductive film 47, and a pixel contact hole 25 to electrically connect the relaying conductive film 47 and the pixel electrode 9.

As shown in FIG. 3 and FIG. 4, the liquid crystal device according to this exemplary embodiment is equipped with a TFT array substrate 10 and an opposing substrate 20 disposed to oppose the TFT array substrate 10. A substrate body 10A of the TFT array substrate 10 is formed of, for example, a quartz substrate, a glass substrate, or a silicon substrate. A substrate body 20A of the opposing substrate 20 is formed of, for example, a glass substrate or a quartz substrate. A liquid crystal is sealed in the space wrapped by a sealant, which is discussed below, between the TFT array substrate 10 and the opposing substrate 20 to form a liquid crystal layer 50. In a state where no electric field is being applied from the pixel electrode 9, the liquid crystal layer 50 is set in a predetermined alignment by alignment layers 16 and 22. The liquid crystal layer 50 is formed of, for example, one type of liquid crystal or a mixture of a few types of nematic liquid crystals. The sealant is used to bond the TFT array substrate 10 and the opposing substrate 20 at their peripheries. The sealant is formed of an adhesive agent made of, for example, a photosetting resin or a thermosetting resin, and a gap material, such as glass fiber or glass beads, to set the distance between the two substrates at a predetermined value is mixed in the adhesive agent.

In the TFT array substrate 10, the lower light shielding film 45 is formed on the substrate body 10A. The lower light shielding film 45 functions to reduce or prevent light from entering the TFT element 30 from the bottom surface of the substrate body 10A, and is formed of a material, such as WSi, that exhibits high light shielding performance. A base insulating film 12 is provided on the whole surface of the lower light shielding film 45 covering the substrate body 10A. The base insulating film 12 functions to insulate the TFT element 30 from the lower light shielding film 45. By being provided on the whole surface of the TFT array substrate 10, the base insulating film 12 also functions to reduce or prevent the characteristics of the pixel switching TFT element 30 from being deteriorated by the stimulation while the surface of the TFT array substrate 10 is polished or by remaining soils after cleaning.

As shown in FIG. 3, in this exemplary embodiment, the pixel switching TFT element 30 has an LDD (Lightly Doped Drain) structure, and is provided with a gate electrode 35, a channel region 1*a* of the semiconductor layer 1 in which a channel is formed by an electric field from the gate electrode 35, an insulating thin film 2 including a gate insulating film to insulate the gate electrode 35 and the semiconductor layer 1, a low-concentration source region 1*b* and a low-concentration drain region 1*c* of the semiconductor layer 1, and a high-concentration source region 1*d* and a high-concentration drain region 1*e* of the semiconductor layer 1. The semiconductor layer 1 may use amorphous silicon, polycrystalline silicon, or monocrystalline silicon or the like.

Formed on the high-concentration drain region 1*e* of the semiconductor layer 1 is the storage capacitor electrode 71 sharing the same layer with the gate electrode 35 through the intermediary of the insulating thin film 2. The semiconductor layer 1 opposing through the intermediary of the insulating thin film 2, and the storage capacitor electrode 71 constitute the storage capacitor 70. In the case of this exemplary embodiment, the gate electrode 35 and the storage capacitor electrode 71 are formed of polycrystalline silicon. The capacitor contact hole 23 is formed, penetrating the base insulating film 12, and the storage capacitor electrode 71 and the lower light shielding film 45 are electrically connected through the capacitor contact hole 23. The lower light shielding film 45 is provided such that it extends from the display region wherein the pixel electrode 9 is disposed to the area around it, and electrically connected with a constant-potential source so as to be set at a fixed potential. The constant-potential source may be of a positive power source or a negative power source to be supplied to a scanning line drive circuit (discussed below) to supply scanning signals to drive the TFT element 30 to the scanning lines 3a, or a data line drive circuit (discussed below) to control a sampling circuit that supplies image signals to the data lines 6a, or may be of a constant potential supplied to a common electrode 48 of the opposing substrate 20. This arrangement makes it possible to form the storage capacitor and also to provide an advantage in that the TFT element 30 is protected from being adversely affected by fluctuation in the potential of the lower light shielding film 45.

As shown in FIG. 3 and FIG. 4, a first interlayer insulating film 41 is formed such that it covers the gate electrode 35 and the storage capacitor electrode 71. On the first interlayer insulating film 41, the data line 6a and the relaying conductive film 47 are formed by sharing the same layer. In the case of this exemplary embodiment, the front surfaces of the data line 6a and the relaying conductive film 47 are formed of such a material as Ti (titanium), TiN (titanium nitride), TiW (titanium tungsten), WSi (tungsten silicide) or AlN (aluminum nitride), while the lower surfaces thereof is formed of aluminum or other metal having low resistance. The use of the material, such as Ti, TiN, TiW, WSi or AlN, for the front surface of the relaying conductive film 47 makes is possible to reduce or prevent corrosion on the contact with ITO used for the pixel electrode 9. Furthermore, as shown in FIG. 3, there is formed a source contact hole 21, which penetrates the first interlayer insulating film 41 and through which the data line 6a and the high-concentration source region 1d of the semiconductor layer 1 are electrically connected. As shown in FIG. 4, there is formed a drain contact hole 24, which penetrates the first interlayer insulating film 41 and through which the relaying conductive film 47 and the high-concentration drain region 1e of the semiconductor layer 1 are electrically connected. The upper surface of the first interlayer insulating film 41 is planarized by a technique, such as chemical mechanical polishing (CMP) or etch-back.

A second interlayer insulating film 42 is formed, covering the data line 6a and the relaying conductive film 47, and a scanning line 3a is formed on the second interlayer insulating film 42. In the case of this exemplary embodiment, like the data line 6a, the scanning line 3a is also formed of aluminum or other metal having low resistance. As shown in FIG. 4, there is formed a gate contact hole 22 that penetrates both the second interlayer insulating film 42 and the first interlayer insulating film 41 to electrically connect the scanning line 3a and the gate electrode 35. Furthermore, a third interlayer insulating film 43 is formed, covering the scanning line 3a, the pixel electrode 9 being formed on the third interlayer insulating film 43. The pixel electrode 9 is formed of a transparent conductive film of, for example, ITO or IZO. As shown in FIG. 4, there is formed a pixel contact hole 25 that penetrates both the third interlayer insulating film 43 and the second interlayer insulating film 42 to electrically connect the pixel electrode 9 and the relaying conductive film 47. With this arrangement, the high-concentration drain region 1e of the semiconductor layer 1 and the pixel electrode 9 are electrically connected through the intermediary of the relaying conductive film 47.

As shown in FIG. 4, the uppermost surface of the TFT array substrate 10 that includes the top of the pixel electrode 9 is provided with an alignment layer 16 formed of a polyimide film or the like that have been subjected to predetermined alignment treatment, such as rubbing treatment. In the configuration described above, the section of the TFT array substrate 10 is shaped such that the region where the scanning line 3a or the data line 6a is formed, that is the peripheral portion of each dot, bulges like an embankment. The difference in height between the topmost portion and the flat portion at the center of the pixel electrode ranges from about 0.2 $\mu$m to about 1.2 $\mu$m. A polarizer 17 is provided at the opposite side from the liquid crystal layer 50 of the substrate body 10A of the TFT array substrate 10.

Meanwhile, the opposing substrate 20 is configured such that the common electrode 48 is provided on the entire surface of the substrate body 20A, and an alignment film 26 made of a polyimide film or the like that has been subjected to predetermined alignment treatment, such as rubbing treatment, is provided on the lower surface side of the common electrode 48, as in the case of the TFT array substrate 10. Like the pixel electrode 9, the common electrode 48 is also formed of a transparent conductive film made of, for example, ITO. A polarizer 27 is provided at the opposite side from the liquid crystal layer 50 of the substrate body 20A of the opposing substrate 20. The opposing substrate 20 may be also provided with a light shielding film of a grid pattern called "black matrix." With this arrangement, the light shielding film on the opposing substrate 20 and the data lines 6a and the scanning lines 3a constituting the light shielding layer on the TFT array substrate 10 make it possible to securely reduce or prevent incident light from entering the channel region 1a or the low-concentration source region 1b and the low-concentration drain region 1c from the opposing substrate 20.

In this exemplary embodiment, the gate electrode 35 constituting the TFT element 30 is not integrally formed with the scanning line 3a. The gate electrode 35 is formed as an isolated island by using a separate layer from that of the scanning line 3a, and the gate electrode 35 and the scanning line 3a are electrically connected through the gate contact hole 22. The section structure, shown in FIG. 3 and FIG. 4, is such that the layer of the scanning lines 3a is positioned between the layer of the data lines 6a and the layer of the pixel electrodes 9. In a top plan view, as shown in FIG. 2, the pattern of the scanning lines 3a partly overlaps the pattern of the data lines 6a and the pattern of the pixel electrodes 9 (the portion denoted by reference character K, which is the overlapping portion indicated with slashes having their right ends up). Based on the structure described above, the portion K wherein the scanning line 3a overlaps the data line 6a and the pixel electrode 9 functions as a shielding layer to reduce or prevent the pixel electrode 9 and the data line 6a from coupling with each other. Hence, the event in which the potential of the pixel electrode 9 varies due to the influences of the data line 6a is controlled, allowing the field reversal drive to be performed. This makes it possible to accomplish a liquid crystal device with a high contrast and a high aperture ratio. As the shielding layer, the scanning lines 3a indispensable for the TFT array substrate 10 are used rather than adding a separate pattern functioning solely as the shielding layer, so that the pattern configuration will not become particularly complicated.

The scanning lines 3a and the data lines 6a are formed of a material, including a low-resistance metal, such as aluminum. Therefore, even if the apparatus is driven at a high frequency of 60 Hz or more, deterioration in display quality attributable to signal delays in the scanning lines 3a or the data lines 6a can be controlled. At the same time, the shielding layer also functions as a built-in light shielding film in which the scanning lines 3a and the data lines 6a are disposed in a grid pattern to prevent the entry of light from the opposing substrate 20. Thus, light leakage current can be adequately restrained, permitting enhanced display quality to be achieved.

In this exemplary embodiment, since the scanning lines 3a and the gate electrodes 35 are constructed using separate layers, the constituent materials for these two can be individually selected. The scanning lines 3a may be formed of a low-resistance metal to reduce or prevent wiring delays, while the gate electrodes 35 may be formed of polycrystalline silicon. As a result, the contamination of gate insulating films, which may occur if a metal is used for the gate electrodes 35, can be reduced or prevented, so that the device characteristics of the TFTs can be stabilized and the reliability can be enhanced.

Furthermore, a lower light shielding film 45 extending in a grid pattern in the directions along the scanning lines 3a and the data lines 6a through the intermediary of the base insulating film 12 is provided below the semiconductor layer 1 constituting the channel region 1a of the TFT element 30. Thus, it is possible to reduce or prevent the entry of light into the TFT element 30 from below the TFT array substrate 10, that is, the return light that enters from the opposing substrate 20, passes through a liquid crystal cell, and enters again due to reflection.

According to the construction of this exemplary embodiment, the high-concentration drain region 1e of the semiconductor layer 1 and the pixel electrodes 9 are electrically connected through the intermediary of a relaying conductive film 47. Hence, even if the interlayer distance between the semiconductor layer 1 and the pixel electrode 9 is long, e.g., about 1 $\mu$m to about 2 $\mu$m, the two can be successfully connected through two or more contact holes of relatively small diameters and the aperture ratio of pixels can be increased, while reducing or avoiding technological difficulties to connect the two with a single contact hole. In general, the semiconductor layer constituting the TFT device is extremely thin. However, it is useful to reduce or prevent over-etching when opening a contact hole.

The peripheral portion of a dot has a shape like an embankment and the liquid crystal layer of this portion is thinner than the liquid crystal layer of the central portion of the dot, so that the intensity of the vertical electric field applied to the liquid crystal layer 50 (the electric field in the direction of the cell thickness of the liquid crystal) is higher in the peripheral portion of a dot, providing an advantage in that the disclination, which is apt to occur in the peripheral portion of a dot, is reduced, thereby reducing or restraining light leakage. In the case of this exemplary embodiment, the upper surface of the first interlayer insulating film 41 below the data lines 6a is planarized, so that the height of the embankment can be adjusted by the layer thickness of both the data lines 6a and the scanning lines 3a, making it possible to securely restrain the disclination.

In the liquid crystal device according to this exemplary embodiment, the pixel switching TFT element 30 preferably has the LDD structure as described above. Alternatively, however, the pixel switching TFT element 30 may have an offset structure in which no impurities are implanted in the low-concentration source region 1b and the low-concentration drain region 1c. Further alternatively, a self-alignment type TFT may be used, in which an impurity is implanted at a high concentration by using the gate electrode as a mask thereby to form a high-concentration source and drain regions in a self alignment manner. The single gate structure has been used, in which only one gate electrode of the pixel switching TFT element 30 is disposed between the high-concentration source region 1d and the high-concentration drain region 1e. However, two or more gate electrodes may be disposed therebetween. Constructing the TFT by dual gates or triple gates makes it possible to reduce or prevent light leakage current at the junction of the channel and the source and drain regions, allowing the OFF current to be reduced. Furthermore, applying the LDD structure or the offset structure to at least one of the gate electrodes allows the OFF current to be further reduced, and a stable switching element can be obtained.

[Second Exemplary Embodiment]

A second exemplary embodiment in accordance with the present invention is explained below with reference to FIG. 5.

The basic construction of a liquid crystal device according to this exemplary embodiment is the same as that of the first exemplary embodiment except for a slight difference in a planar pattern. Therefore, the descriptions are only provided of the planar pattern by using FIG. 5 (like reference numerals being assigned to a top plan view corresponding to FIG. 2 of the first exemplary embodiment, and to like constituent elements as those in FIG. 2), and the descriptions of the same parts is omitted.

Figure 5:
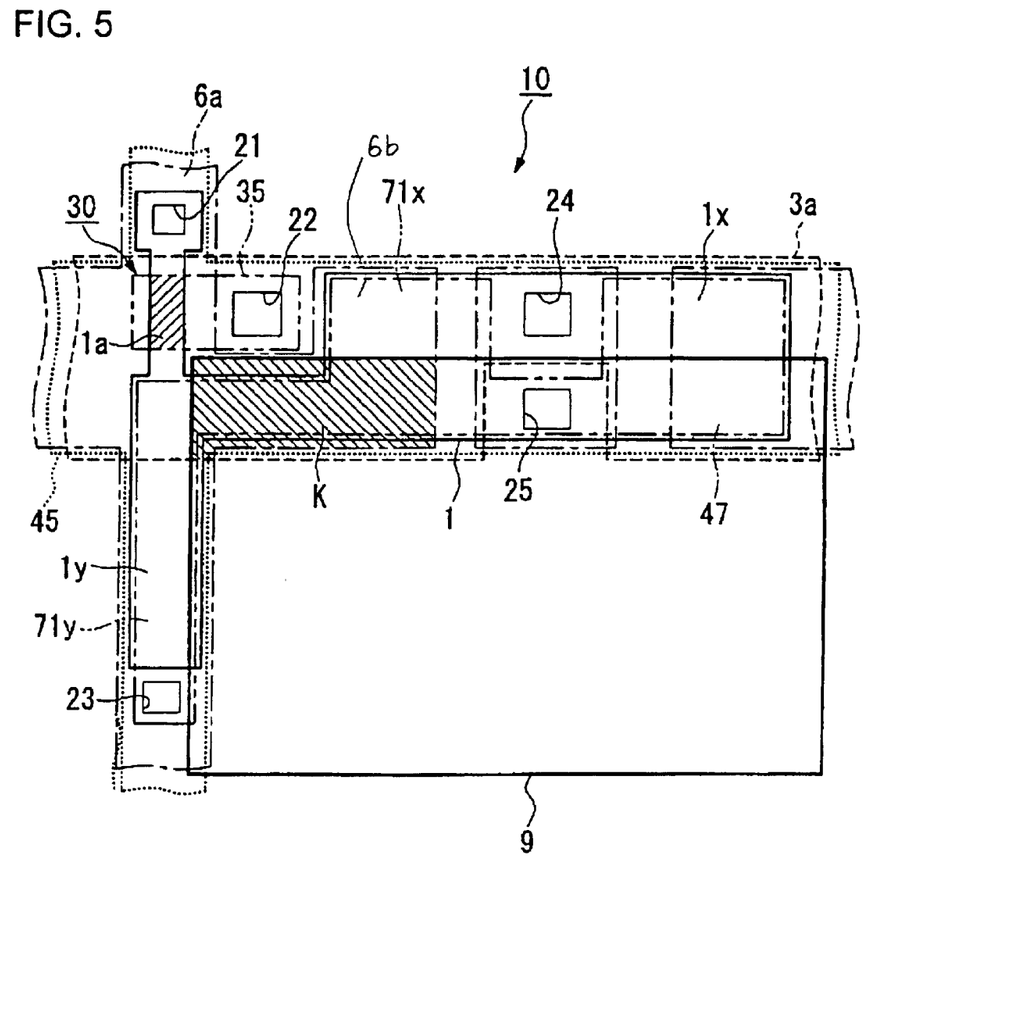
FIG. 5 is a top plan view showing a pattern configuration of one dot of a TFT array substrate (active matrix substrate) used with a liquid crystal device according to a second exemplary embodiment of the present invention.

While the data lines 6a have been linearly formed in the vertical direction in FIG. 2 in the first exemplary embodiment, a data line 6a in this embodiment has a data line trunk extending in the vertical direction and also has a portion 6b protruding horizontally along a scanning line 3a from the data line trunk, as shown in FIG. 5.

In the case of this exemplary embodiment, the data line 6a protrudes along the scanning line 3a at its portion crossing the scanning line 3a, and the edge of the data line 6a is positioned farther from a channel region 1a of a TFT element 30, as compared with the first exemplary embodiment. This arrangement makes it more difficult for light to enter the channel region 1a of the TFT element 30 by the data line 6a, allowing the deterioration in display quality due to light leakage current to be restrained more securely. In the case of this exemplary embodiment, the presence of the protruding portion 6b of the data line 6a adds to the area of the portion wherein the data line 6a and the pixel electrode 9 overlap. However, the scanning line 3a also overlaps the portion (portion K indicated by slashes with their right ends up in FIG. 5), and the portion K of the scanning line 3a functions as a shielding layer against the coupling between the data line 6a and the pixel electrode 9, so that no problem in particular will arise.

[Third Exemplary Embodiment]

Figure 6:
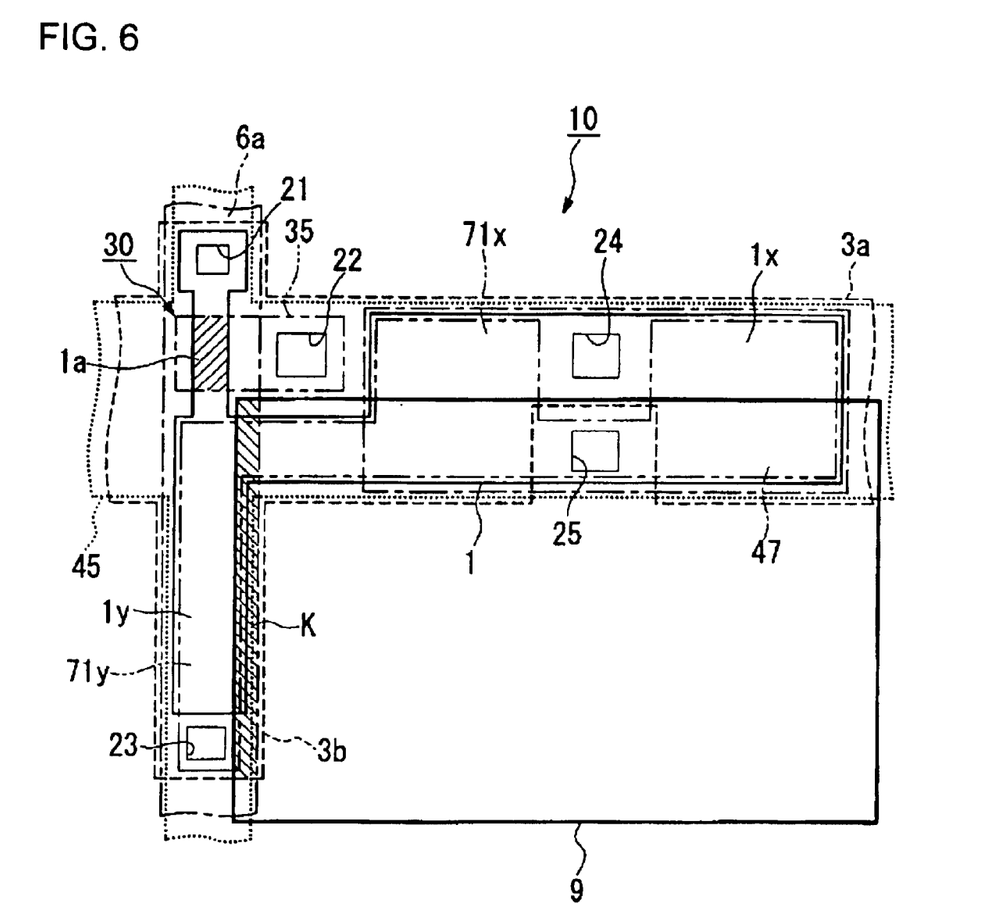
FIG. 6 is a top plan view showing a pattern configuration of one dot of a TFT array substrate (active matrix substrate) used with a liquid crystal device according to a third exemplary embodiment of the present invention.

A third exemplary embodiment in accordance with the present invention is explained below with reference to FIG. 6.

The basic construction of a liquid crystal device according to this exemplary embodiment is the same as that of the first exemplary embodiment except for a slight difference in a planar pattern. Therefore, the descriptions are only provided of the planar pattern by using FIG. 6 (like reference numerals being assigned to a top plan view corresponding to FIG. 2 of the first exemplary embodiment, and to like constituent elements as those in FIG. 2), and the descriptions of the same parts are omitted.

The data lines 6a have been linearly formed in the vertical direction in the first exemplary embodiment, and the data line 6a in the second exemplary embodiment has had the portion protruding in the horizontal direction. A data line 6a in this exemplary embodiment is linearly formed in the vertical direction, while a scanning line 3a has its scanning line trunk extending in the horizontal direction and has a portion 3b protruding in the vertical direction along the data line 6a from the scanning line trunk, as shown in FIG. 6.

In the case of this exemplary embodiment, the pattern configurations of the layers are substantially the same as those of the first exemplary embodiment. However, the scanning line 3a has the portion 3b protruding in the vertical direction, and the portion 3b of the scanning lines 3a overlaps the data line 6a and a pixel electrode 9 (portion K indicated by slashes with their right ends up in FIG. 6), so that the portion functioning as the shielding layer against the coupling between the data line 6a and the pixel electrode 9 is larger than that in the first exemplary embodiment. This arrangement provides a pattern configuration that makes it more difficult for changes in the potential of the data line 6a to affect the pixel electrode 9. The use of the field reversal drive is possible, thereby permitting higher display quality to be achieved. In the first through third exemplary embodiments according to the present invention, the scanning lines 3a are formed of a metal to exhibit low resistance. This makes it possible to obtain an advantage of reduced transverse cross-talk. The advantage is not limited to the case where the field reversal drive is adopted. The same advantage can be obtained also when, for example, 1H reversal drive, 1S reversal drive or dot reversal drive is adopted.

[General Configuration of Liquid Crystal Device]

Figure 7:
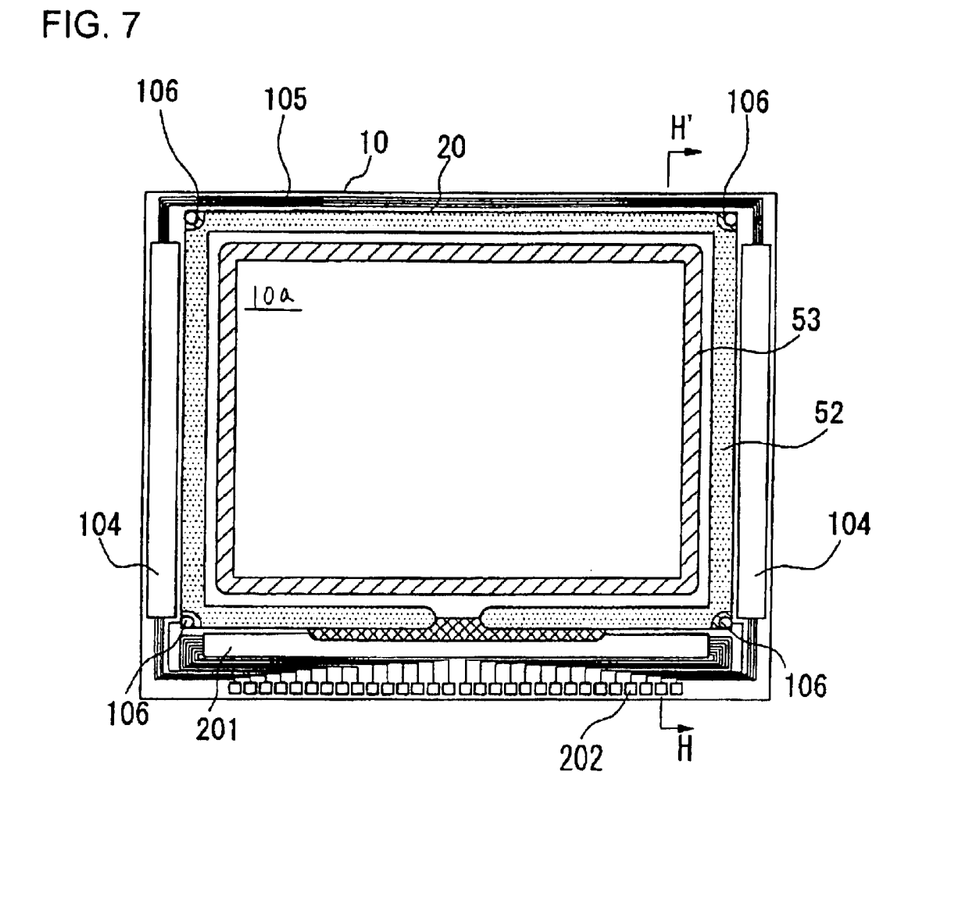
FIG. 7 is a schematic top plan view of a TFT array substrate observed from an opposing substrate side with constituent elements formed thereon which shows the general construction of a liquid crystal device in accordance with the present invention.

The general configuration of the liquid crystal device in each exemplary embodiment configured as described above is explained below with reference to FIG. 7 and FIG. 8. FIG. 7 is a top plan view of the TFT array substrate with constituent elements formed thereon viewed from the opposing substrate side, and FIG. 8 is a sectional view taken along plane H–H' of FIG. 7.

Figure 8:
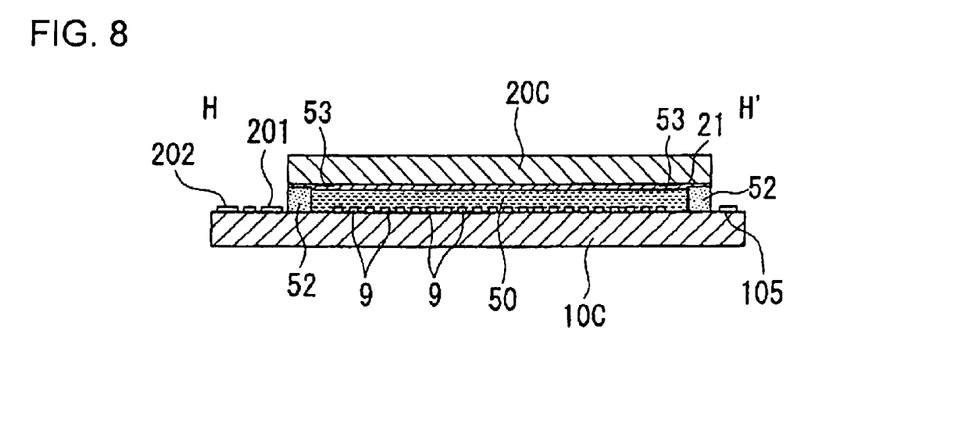
FIG. 8 is a sectional view taken along plane H–H' of FIG. 7.

In FIG. 7 and FIG. 8, a TFT array substrate 10 is the TFT array substrate explained in the aforesaid first through third exemplary embodiments. On the TFT array substrate 10, a sealant 52 is provided along the edge thereof, and a light shielding film 53 serving as a frame to define the periphery of an image display region is provided in parallel to the inner side of the sealant 52. In the region outside the sealant 52, a data line drive circuit 201 for driving the data lines 6a by supplying image signals to the data lines 6a at predetermined timings and an external circuit connection terminal 202 are provided along one side of the TFT array substrate 10. Scanning line drive circuits 104 to drive the scanning lines 3a by supplying scanning signals to the scanning lines 3a at predetermined timings are provided along two sides adjacent to the above one side. If the delay of scanning signals supplied to the scanning lines 3a does not cause a problem, then only one of the scanning line drive circuits 104 may be provided. The data line drive circuits 201 may be arranged on both sides along the sides of an image display region 10a. Furthermore, a plurality of wires 105 for connecting the scanning line drive circuits 104 provided on both sides of the image display region is provided on the remaining one side of a TFT array substrate 10C.

An opposing substrate 20 is the one explained in the aforesaid first exemplary embodiment. In at least one of the corners of the opposing substrate 20, a conductive member 106 for electrical conduction between the TFT array substrate 10 and the opposing substrate 20 is provided. As shown in FIG. 8, the opposing substrate 20 having substantially the same profile as that of the sealant 52 shown in FIG. 7 is secured to the TFT array substrate 10 by the sealant 52.

In this exemplary embodiment, the TFT gate lines constituting the data line drive circuit 201 and the scanning line drive circuit 104 can be constructed by using the layer constituting the scanning lines 3a, the layer constituting the data lines 6a, or the layer constituting the gate electrodes 35 explained in the first exemplary embodiment. In other words, regarding the TFT constituting these drive circuits, there is no need to use the same construction as that of the aforesaid pixel switching TFT, so that the gate lines may be formed by selecting the layer constituting the scanning lines, the layer constituting the data lines, or the layer constituting the gate electrodes.

On the TFT array substrate 10, a sampling circuit to apply image signals to a plurality of data lines 6a at predetermined timings, a pre-charge circuit to supply pre-charge signals at predetermined voltage levels to a plurality of data lines 6a prior to image signals, or an inspection circuit to inspect the liquid crystal device for quality, defects, etc., during manufacture or before shipment may be formed in addition to the data line drive circuit 201, the scanning line drive circuit 104, etc.

In the exemplary embodiment described above, instead of providing the data line drive circuit 201 and the scanning line drive circuit 104 on the TFT array substrate 10, they may be electrically and mechanically connected to a drive LSI mounted on, for example, a TAB (Tape Automated Bonding) substrate, through the intermediary of an anisotropic conductive film provided on the peripheral portion of the TFT array substrate 10.

[Application Example of Liquid Crystal Device]

The liquid crystal device in any one of the exemplary embodiments described above can be applied to projection display units (projectors). The following describes a liquid crystal projector in which the aforesaid liquid crystal device is used as a light valve.

Figure 9:
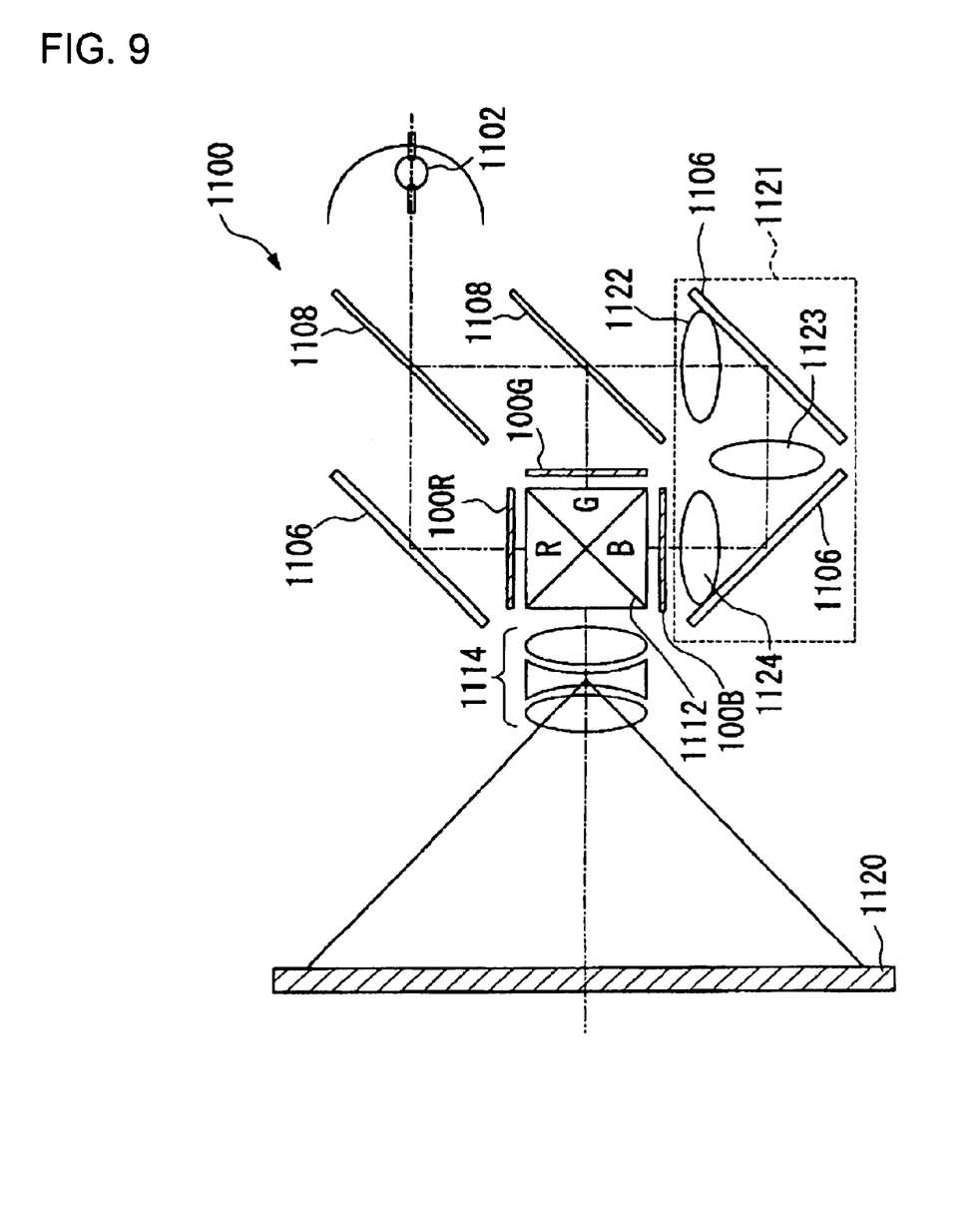
FIG. 9 is a schematic that shows a liquid crystal projector, which is an exemplary electronic equipment in accordance with the present invention.

FIG. 9 is a schematic of the liquid crystal projector. As shown in FIG. 9, a lamp unit 1102 formed of a white light source, such as a halogen lamp, is provided in a projector 1100. The projection light beam emitted from the lamp unit 1102 is separated into primary colors of RGB through three mirrors 1106 and two dichroic mirrors 1108 disposed inside, then guided to light valves 100R, 100G and 100B corresponding to the respective primary colors.

The light valves 100R, 100G and 100B have the same constructions as those of the liquid crystal devices according to the aforesaid exemplary embodiments, and are driven by primary color signals of R (red), G (green) and B (blue) supplied from a processing circuit (not shown) to receive image signals. The light of color B has a longer optical path than that of the remaining color R or color G. Therefore, it is guided through the intermediary of a relay lens system 1121 formed of an incident lens 1122, a relay lens 1123 and an emergent lens 1124 in order to reduce or prevent its loss.

The light beams modulated by the light valves 100R, 100G and 100B are incident upon a diachronic prism 1112 from three directions. Then, in the dichroic prism 1112, the beams of color R and color B are refracted 90 degrees, whereas the beam of color G advances straight. Hence, after the images of the individual colors are synthesized, a color image is projected on a screen 1120 through a projection lens 1114.

The beams corresponding to the primary colors, R, G and B, enter the light valves 100R, 100G and 100B through the dichroic mirrors 1108, so that there is no need to provide a color filter, as described above. The transmission images of the light valves 100R and 100B are projected after being reflected by the dichroic prism 1112, while the transmission image of the light valve 100G is directly projected. Therefore, the display images by the light valves 100R and 100B are laterally reversed with respect to the display image by the light valve 100G.

In any one of the exemplary embodiments, the opposing substrate is not provided with a color filter. However, RGB color filters may be formed, together with protective films therefor, on the opposing substrate in a predetermined region opposing the pixel electrode 9. With this arrangement, the liquid crystal device in any one of the embodiments can be applied to a direct view or reflective color liquid crystal device in addition to the projector.

One micro lens for each pixel may be formed on the opposing substrate.

Alternatively, a color filter layer made of a color resist or the like may be formed below the pixel electrodes 9 opposing RGB on the TFT array substrate. This arrangement enhances the condensing efficiency of incident light, permitting a bright liquid crystal device to be accomplished.

Furthermore, a plurality of interference layers having different refractive indexes may be deposited on the opposing substrate to form a dichroic filter for producing RGB colors by making use of light interference. The opposing substrate with the dichroic filter allows a brighter color liquid crystal device to be realized.

The technological scope of the present invention is not limited to the above exemplary embodiments, and it is possible to make various modifications within the spirit of the present invention. For instance, the first exemplary embodiment is an example in which the TFT element 30, etc., have been formed on the flat substrate body 10A and the first interlayer insulating film 41 has been planarized. Alternatively, however, the second interlayer insulating film may be planarized. In this case, the steps can be designed using only the film thickness of the gate lines.

As an alternative, grid-like grooves may be formed in the substrate body 10A, and the wires and elements, such as the scanning lines 3a, the data lines 6a and the TFT elements 30 may be buried in the grooves. In this case, the difference in step level between the area where the wires, the elements, etc., exist and the area free of them will be smaller, making it possible to reduce image defects, such as liquid crystal alignment defects, attributable to the difference in step level. The pattern configurations, the sectional structures, the constituent materials of the films, etc., that have been described are just examples, and may be changed as necessary. The present invention can also be applied to, for example, an electroluminescence (EL) device, a digital micro-mirror device (DMD) or electro-optical devices using various electro-optic devices using plasma emission or fluorescence or the like based on electron emission, and electronic equipment equipped with the electro-optical device.

[Advantages]

As explained in detail above, according to the present invention, the portion in which the scanning lines overlap the data lines and the pixel electrodes in a top plan view functions as the shielding layer to block the coupling between the pixel electrodes and the data lines. This arrangement restrains the fluctuation in the potential of the pixel electrodes caused by the influences of the data lines, allowing the field reversal drive to be accomplished. As a result, an electro-optical device, such as a liquid crystal device, for example, with a high contrast and a high aperture ratio can be realized.

What is claimed is:

1. An active matrix substrate, comprising:

a substrate body including a plurality of data lines and a plurality of scanning lines provided so as to cross each other;

a plurality of thin-film transistors electrically connected to the data lines and the scanning lines;

a plurality of pixel electrodes electrically connected to the plurality of thin-film transistors, respectively; and an interlayer insulating film;

the thin-film transistors and the scanning lines constituting gate electrodes, the gate electrodes being formed in separate layers, and electrically connected via contact holes penetrating the interlayer insulating film between the gate electrodes and the scanning lines; and the scanning lines constituting a layer positioned above a layer constituted by the data lines but under a layer constituted by the pixel electrodes, and a pattern of the scanning lines, a pattern of the data lines and a pattern of the pixel electrodes being partly overlapped in a top plan view.

2. The active matrix substrate according to claim 1, the scanning lines being formed of a material including a metal.

3. The active matrix substrate according to claim 1, the data lines being formed of a material including a metal.

4. The active matrix substrate according to claim 1, the gate electrodes being formed of polycrystalline silicon.

5. The active matrix substrate according to claim 1, further including a light shielding film extending in a matrix pattern in the directions along the scanning lines and the data lines, through the intermediary of an interlayer insulating film, below a semiconductor layer constituting channel regions of the thin-film transistors.

6. The active matrix substrate according to claim 1, further including a storage capacitor electrode to form a storage capacitor between itself and the semiconductor layer constituting the channel regions of the thin-film transistors, and the storage capacitor electrode being formed of the same layer as the layer constituting the gate electrode.

7. The active matrix substrate according to claim 6, the storage capacitor electrode and the light shielding film being electrically connected via a contact hole penetrating an interlayer insulating film between the storage capacitor electrode and the light shielding film.

8. The active matrix substrate according to claim 1, the scanning lines having portions that protrude along the data lines from trunks of the scanning lines.

9. The active matrix substrate according to claim 1, the data lines having portions that protrude along the scanning lines from trunks of the data lines.

10. The active matrix substrate according to claim 1, further including a relaying conductive film formed of the same layer as the layer constituting the data lines, and the semiconductor layer and the pixel electrodes being electrically connected through the relaying conductive film.

11. The active matrix substrate according to claim 10, the pixel electrodes being formed of a transparent conductive film, and at least the upper surface of the relaying conductive film being formed of a material for ohmic junction with the transparent conductive film.

12. The active matrix substrate according to claim 1, further including a drive circuit to drive the scanning lines or the data lines, and a gate line for a thin-film transistor constituting the drive circuit being formed by using the layer constituting the scanning lines, the layer constituting the data lines, or the layer constituting the gate electrodes.

13. The active matrix substrate according to claim 1, the upper surface of a region where the scanning lines or the data lines are formed being positioned at a higher level than the upper surface of a central portion of a region wherein the pixel electrodes are formed.

14. The active matrix substrate according to claim 1, an upper surface of the interlayer insulating film in contact, at the bottom side of the data lines, with the data lines being planarized.

15. The active matrix substrate according to claim 1, an upper surface of the interlayer insulating film in contact, at the bottom side of the scanning lines, with the scanning lines being planarized.

16. The active matrix substrate according to claim 1, further including a recessed portion in the region of the substrate body where the thin-film transistors are formed.

17. An electro-optical device, comprising:
the active matrix substrate according to claim 1.

18. An electronic equipment, comprising:
the electro-optical device according to claim 17.

* * * * *